United States Patent [19]
Kimura et al.

[11] 4,362,581
[45] Dec. 7, 1982

[54] MAGNETIC ALLOY

[75] Inventors: Hiroshi Kimura; Kenji Abiko; Takashi Sato; Isamu Yoshii; Sadao Watanabe; Yutaka Takei, all of Miyagi, Japan

[73] Assignee: Sony Corporation, Tokyo, Japan

[21] Appl. No.: 229,990

[22] Filed: Jan. 30, 1981

Related U.S. Application Data

[63] Continuation-in-part of Ser. No. 91,033, Nov. 5, 1979, Pat. No. 4,299,622.

[30] Foreign Application Priority Data

Feb. 5, 1980 [JP] Japan .................................. 55-12710

[51] Int. Cl.³ .............................................. C04B 35/00
[52] U.S. Cl. .............................. 148/31.55; 75/123 D; 75/123 L; 75/123 H; 75/123 J; 75/123 M
[58] Field of Search .................. 148/31.55; 75/123 D, 75/123 L, 123 H, 123 J, 123 M

[56] References Cited

U.S. PATENT DOCUMENTS

| | | | |
|---|---|---|---|
| 1,352,534 | 9/1920 | Russell | 75/123 L |
| 3,767,386 | 10/1973 | Ueda et al. | 75/123 J |
| 4,023,990 | 5/1977 | Lex | 75/123 D |

*Primary Examiner*—John P. Sheehan
*Attorney, Agent, or Firm*—Hill, Van Santen, Steadman, Chiara & Simpson

[57] ABSTRACT

A magnetic alloy which contains not less than 0.03 weight percent but not more than 5.0 weight percent of P, not less than 0.01 weight percent but not more than 5.0 weight percent of at least one element of Ti, Nb, and Zr, not less than 2.5 weight percent but not more than 10 weight percent Si and the remaining part consisting mainly of Fe is disclosed. In the alloy, P is segregated on the grain boundaries thereof with a specified amount which results in a superior magnetic characteristics and workability represented by the fact that the alloy can be rolled.

2 Claims, No Drawings

MAGNETIC ALLOY

REFERENCE TO RELATED APPLICATION

This application is a continuation-in-part of U.S. Ser. No. 91,033, filed Nov. 5, 1979, now U.S. Pat. No. 4,299,622, issued Nov. 10, 1981.

BACKGROUND OF THE INVENTION

1. Field of the Invention

The present invention relates to magnetic alloys, especially to iron-silicon alloys which can be rolled into a sheet.

2. Prior Art

Iron-silicon alloys, so-called silicon steel are widely used for electrical purposes, such as, core material for generators and transformers, since the iron-silicon alloys are higher in saturation magnetic induction, permeability, electrical resistivity and lower in cost, as compared with iron.

The iron-silicon alloys which contain small amounts of silicon can be easily rolled and widely used for the above mentioned electrical purposes. While it is known that in the iron-silicon alloys as the amount of silicon increases, magnetotriction and magnetic anisotropy of the alloy decrease, especially at a silicon content of 6.5 weight percent, the magnetostriction of the alloy becomes zero which results in improved magnetic characteristics as soft magnetic material that is high in permeability and electrical resistivity, and low in iron loss.

The sheet silicon steel was drastically improved when grain obtained sheet silicon steel was proposed in which orientation of crystal axis of secondary recrystallization after rolling is selected along (011) [100] directions, which results in low iron loss, high permeability along the rolling direction and high saturation magnetic induction. Further bidirectionally oriented sheet silicon sheet was proposed which exhibited superior magnetic characteristics along directions along and perpendicular to rolling.

Recently, as the increase of demands for electric power supply, transformer substations of large capacity are built in the streets area, it is the problem to reduce a noise caused by the transformer. It is known that the noise of the transformer is caused mainly by vibrations due to magnetostriction of the cores which form the transformer, and it is desirable to employ silicon rich iron-silicon alloys having small magnetostriction as core material for the transformer.

In the iron-silicon alloys, as the amount of silicon increases, hardness of the alloy increases, especially in the alloy containing not less than 4.5 weight percent silicon, malleability of the alloy is lost suddenly, and the rolling of the alloy becomes difficult which is a large bottleneck for industrial use of the iron-silicon alloys.

The reports on the rolling of iron-silicon alloy containing 6.5 weight percent silicon which has poor malleability can scarcely found, however, a report titled "Rolling of brittle metal" appeared in Journal of Japan Society for Technology of Plasticity Vol. 8, No. 77 (June 1967) pages 317–321 reports that iron-silicon alloy containing 6.5 weight percent silicon having a thickness of 10 mm could be rolled into a sheet having a thickness 0.018 mm by rolling with different material layers which were rich in malleability strongly adhered on both sides of the iron-silicon alloy. However, in this case even the iron-silicon alloy sheet was obtained experimentally by employing assistant material, it is quite difficult to obtain the iron-silicon alloy sheet of large amount stably without using special technique in industrial scale.

"Cold rolling of 6.5% Si-Fe alloys and magnetic characteristics" appeared in Journal of Japan Society of Metals Vol. 30 (1966) pages 552–558 and reported that iron-silicon alloy containing 6.5 weight percent silicon was rolled at a temperature between 600° to 750° C. with a rolling ratio of 70%, and after that both sides of the alloy sheets were cut out where a number of cracks were generated. Then the sheet of 1 mm thickness was rolled to the sheet having not more than 0.3 mm thickness. However, in this paper, it is reported that when rolling the iron-silicon alloy containing more than 5.0 weight percent silicon to a thickness of thinner than 1 mm, cracks were frequently generated, and it was practically difficult to make alloys sheets without generation of cracks.

It is known that the magnetostriction of the alloy is strongly affected by mechanical stress applied to the alloy by mechanical working such as bending or rolling. Then, even if silicon rich iron-silicon alloys having small magnetostriction are employed, it is difficult to decrease the magnetostriction caused by the mechanical stress due to the poor workability of the alloy, which results in unsatisfactory results in decreasing the noise of transformer.

OBJECT AND SUMMARY OF THE INVENTION

It is an object of the present invention to provide improved iron-silicon magnetic alloys.

It is another object of the present invention to provide iron-silicon magnetic alloys superior in rolling capability.

It is further object of the present invention to provide iron-silicon magnetic alloy improved in rolling capability.

It is still further object of the present invention to provide iron-silicon magnetic alloys sheets which can be easily manufactured by rolling without injuring superior magnetic characteristics.

According to one aspect of the present invention, there is provided a magnetic alloy contains not less than 0.03 weight percent but not more than 5.0 weight percent of P, not less than 0.01 weight percent but not more than 5.0 weight percent of at least one element of Ti, Nb, and Zr, not less than 2.5 weight percent but not more than 10.0 weight percent of Si, and the remaining part consisting mainly of Fe, and the alloy is characterized in that P is present on the grain boundaries thereof in an amount of more than 0.5 weight percent of the atoms which form the grain boundaries.

DESCRIPTION OF THE PREFERRED EMBODIMENTS

The present invention will be hereinafter described in detail. According to the present invention, in the iron-silicon alloys containing not less than 2.5 weight percent silicon to decrease iron loss and magnetostriction, and not more than 100 weight percent silicon to avoid decrease of the saturation magnetic induction, P and at least one of the elements of Ti, Nb, and Zr are added to the alloy to improve the rolling workability by strengthening the grain boundaries and reduce the size of grains. The iron-silicon alloys of the present invention contain not less than 0.03 weight percent but not more than 5.0 weight percent of P, at least one of the elements of Ti, Nb, and Zr with the total amount of not less than 0.1 weight percent but not more than 5.0 weight percent, not less than 25 weight percent but not more than 10.0 weight percent of silicon and remaining part composed mainly of Fe, and in the alloy not less than 0.5 weight percent of P are segregated on the grain boundaries for the atoms which form the grain boundaries.

Further, in the present invention, in place of Fe, there may be employed at least one of the elements selected from not more than 7.0 weight percent of Cr, not more than 5.0 weight percent of Mn, not more than 7.0 weight percent of Ni, not more than 6.0 weight percent of Cu, not more than 5.0 weight percent of Y, not more than 3.0 weight percent of rare earth elements, not more than 0.3 weight percent of B, not more than 0.5 weight percent of Pb, not more than 3.0 weight percent of Be, not more than 0.8 weight percent of C, not more than 0.1 weight percent of N, not more than 0.5 weight percent of Ca, not more than 5.0 weight percent of V, not more than 5.0 weight percent of Ge, not more than 5.0 weight percent of Mo, not more than 5.0 weight percent of Hf, not more than 5.0 weight percent of Ta, not more than 5.0 weight percent of W, not more than 3.0 weight percent of Sn, not more than 3.0 weight percent of Sb, with a total amount of not less than 0.01 weight percent but not more than 10 weight percent. In case the alloy contains such additional elements, P is also segregated on the grain boundaries of the alloy with the amount not less than 0.5 weight percent of the atoms which form the grain boundaries.

The added element Cr is used to improve the wear resistance of the alloy, and the added elements Mn, Ni, Cu, Y, rare earth elements, B, Pb, Be are used to improve the rolling capability and workability of the alloy. C and N are respectively added to provide carbide and nitride to thereby increase the strength of the alloy, and Ca is added to provide a good ingot i.e., prevent cracks and extraordinary grain structure from being generated in the alloy by the deoxidation action of Ca. The added elements V, Ge, Mo, Hf, Ta, W, Sn, Sb are used to increase the hardness of the alloy. When the added amount of B is not less than 0.001 weight percent the adding effect thereof appears, while when the adding amounts of the other elements i.e., Cr, Mn, Ni, Cu, Y, rare earth elements, Pb, Be, C, N, Ca, V, Ge, Mo, Hf, Ta, W, Sn, Sb are not less than 0.01 weight percent, their adding effects appear. However, it was found that when the total adding amount of the elements exceed 10.0 weight percent, rolling capability and magnetic characteristics were deteriorated.

Next, an example of the present invention will be described.

EXAMPLE

A total amount of 5 kg of raw materials, which contains electrolytic refined iron consisting of 99.9 weight percent Fe, Si with 99.999% purity, Fe-25%P (ferrophoophor mother alloy containing 25 weight percent of phosphorus) and various added elements, were subjected to the induction melting by using a crucible made of alumina which was located in a vacuum furnance under a pressure of less than $1\times10^{-4}$ mmHg, and the melt thus made was poured in a mould having a diameter of 5 cm and then cast in a vacuum furnance. This casting was carried out by the method in which a tape heater was wound on the outer side of the mould to keep the mould at a temperature of about 500° C., then the melt was poured in the mould, and was generally cooled between the temperature range from 800° C. to 500° C. at a cooling speed of 3.0° C./min. and after the temperature arrived at 500° C., the power supply to the tape heater was stopped to cool the same to the room temperature. From the ingots thus obtained, blocks having the dimensions of 35 mm × 30 mm × 15 mm were cut out. Thus made blocks were subjected to the hot rolling at 400° to 1000° C. The rolling was carried out repeatedly for 15 times to obtain thin alloy sheets having the thickness of about 0.3 mm. By the above method, alloy samples containing various added elements were prepared and rolled according to the above method. The obtained alloy sheets were subjected to the evaluation of rolling capability and magnetic characteristic, i.e., initial permeability $\mu o$, maximum permeability $\mu m$, coercive force Hc, iron loss $^{W}10/50$ (core loss measured under the application of a magnetic field of 10 KGauss at 50 Hz), and the measured results are summerized in the following Table I.

TABLE I

| Sample | Principal component (weight %) Fe | Si | Subcomponent (weight %) | Rolling capability | Magnetic characteristic $\mu_o$ | $\mu_m$ | Hc(Oe) | W10/50 (watt/kg) |
|---|---|---|---|---|---|---|---|---|
| 1 | residual part | 2.20 | | ○ | 1100 | 10500 | 0.40 | 2.50 |
| 2 | " | 3.80 | | ○ | 1050 | 12700 | 0.34 | 1.78 |
| 3 | " | 4.75 | | Δ | 1085 | 11800 | 0.30 | 1.55 |
| 4 | " | 5.34 | | X | 1150 | 12300 | 0.31 | 0.94 |
| 5 | " | 6.11 | | X | 1300 | 20100 | 0.28 | 0.55 |
| 6 | " | 6.54 | | X | 1525 | 23500 | 0.23 | 0.50 |
| 7 | " | 6.80 | | X | 1430 | 24000 | 0.25 | 0.60 |
| 8 | " | 6.45 | P 0.01 | X | | | | |
| 9 | " | 6.75 | P 0.03 | Δ | | | | |
| 9A | " | 6.47 | P 0.03 | ○ | | | | |
| 10 | " | 6.52 | P 0.10 | ○ | | | | |
| 11 | " | 6.48 | P 0.51 | ○ | | | | |
| 12 | " | 6.50 | P 1.22 | ○ | | | | |
| 13 | " | 6.51 | P 0.25 Ti 0.5 | ◎ | 1050 | 19800 | 0.31 | 0.72 |
| 14 | " | 6.47 | P 0.24 Ti 1.0 | ◎ | 1030 | 18100 | 0.34 | 0.74 |
| 15 | " | 6.49 | P 0.50 Ti 1.0 | ◎ | 1000 | 17900 | 0.33 | 0.80 |
| 16 | " | 6.50 | P 0.05 Ti 0.1 | ○ | 1180 | 19500 | 0.30 | 0.70 |
| 17 | " | 6.44 | Ti 0.5 | X | | | | |
| 18 | " | 6.52 | Ti 1.0 | X | | | | |
| 19 | " | 6.48 | Nb 0.5 | X | | | | |
| 20 | " | 6.51 | Zr 0.7 | X | | | | |
| 21 | " | 6.49 | P 0.25 Nb 1.0 | ◎ | 1050 | 17000 | 0.31 | 0.79 |

TABLE I-continued

| Sample | Principal component (weight %) Fe | Si | Subcomponent (weight %) | Rolling capability | Magnetic characteristic $\mu_o$ | $\mu_m$ | Hc(Oe) | W10/50 (watt/kg) |
|---|---|---|---|---|---|---|---|---|
| 22 | " | 6.52 | P 0.24 Zr 0.8 | ◎ | 1100 | 17700 | 0.28 | 0.88 |
| 23 | " | 6.47 | P 0.28 V 1.0 | ○ | | | | |
| 24 | " | 6.45 | P 0.28 Cr 0.9 | ○ | | | | |
| 25 | " | 6.52 | P 0.31 Mn 1.2 | ○ | | | | |
| 26 | " | 6.50 | P 0.25 Co 0.5 | ○ | | | | |
| 27 | " | 6.48 | P 0.24 Ni 2.0 | ○ | | | | |
| 28 | " | 6.53 | P 0.27 Cu 1.0 | ○ | | | | |
| 29 | " | 6.49 | P 0.30 Ge 0.9 | ○ | | | | |
| 30 | " | 6.48 | P 0.24 Y 0.7 | ○ | | | | |
| 31 | " | 6.52 | P 0.26 Mo 1.3 | ○ | | | | |
| 32 | " | 6.50 | P 0.25 Hf 1.0 | ○ | | | | |
| 33 | " | 6.47 | P 0.23 Ta 1.5 | ○ | | | | |
| 34 | " | 6.48 | P 0.27 W 1.5 | ○ | | | | |
| 35 | " | 6.50 | P 0.25 La 0.8 | ○ | | | | |
| 36 | " | 6.50 | P 0.26 B 0.03 | ○ | | | | |
| 37 | " | 6.52 | P 0.25 Ca 0.05 | ○ | | | | |
| 38 | " | 6.49 | P 0.25 C 0.04 | ○ | | | | |
| 39 | " | 6.48 | P 0.28 N 0.04 | ○ | | | | |
| 40 | " | 6.49 | P 0.24 Sn 1.1 | ○ | | | | |
| 41 | " | 6.51 | P 0.25 Sb 1.0 | ○ | | | | |
| 42 | " | 6.48 | P 0.24 Pb 0.07 | ○ | | | | |
| 43 | " | 6.49 | P 0.25 Be 0.9 | ○ | | | | |
| 44 | " | 6.45 | P 0.28 Ti 0.2 Cr 0.9 | ◎ | | | | |
| 45 | " | 6.52 | P 0.31 Ti 0.2 Mn 1.2 | ◎ | | | | |

In the Table I, on the column of the rolling capability, the mark ◎ indicates a case where the block of 15 mm thickness was rolled until the thickness became 0.3 mm, that is, the rolling ratio of 98%, quite easily without generating cracks, the mark ○ indicates such a case where the rolling was successfully carried out without generating cracks, the mark Δ indicates such a case where the rolling could be carried out, however some cracks appeared, and the mark X indicates such a case that a number of cracks appeared upon rolling and the rolling became impossible. The magnetic characteristics were measured on ring shaped samples having the outer diameter of 25 mm and the inner diameter of 15 mm cry out from the successfully rolled alloy sheets by spark cutting and annealed in hydrogen gaseous atmosphere at 1100° C. for 2 hours. The magnetic characteristics were measured on the bulk sample when the sample could not be rolled.

The following Table II shows the results of the Auger electron spectroscopy on the fractured surface of some samples and shows the relation between the amount of segregated subcomponents on the grain boundaries and rolling capability.

TABLE II

| Sample No. | Amount of subcomponents (weight %) | Amount of sub-components on grain boundaries (weight %) | Rolling capability |
|---|---|---|---|
| 6 | P 0 | P 0 | X |
| 9 | P 0.03 | P 0.06 | Δ |
| 9A | P 0.03 | P 0.51 | ○ |
| 11 | P 0.51 | P 0.58 | ○ |
| 13 | P 0.25, Ti 0.50 | P 5.0, Ti 7.4 | ◎ |
| 15 | P 0.50, Ti 1.00 | P 6.5, Ti 6.5 | ◎ |
| 16 | P 0.05, Ti 0.10 | P 0.8, Ti 1.0 | ○ |
| 21 | P 0.25, Nb 1.00 | P 4.7, Nb 1.5 | ◎ |
| 22 | P 0.24, Zr 0.80 | P 6.0, Zr 1.0 | ◎ |
| 31 | P 0.26, Mo 1.30 | P 7.5, Mo 7.8 | ○ |

Samples 9 and 9A, both contain the same amount of P i.e., 0.3 weight % in the alloy, however the sample 9A was obtained by rolling after annealed at a temperature of 1000° C. for 10 hours, in which the segregated amount of P on the grain boundaries of the sample 9A was 0.51 weight percent which was much larger than the segregated amount of P of the sample 9 which was 0.06 weight percent.

As apparent from Table I, the samples 4 to 7 containing more than 4.5 weight percent of Si without addition of P can not be rolled, however, the samples 9 to 12 containing similar amount of Si added with not less than 0.03 weight percent P can be rolled. Further it is understood by comparing the samples 9 and 9A in Table II the alloy having larger amounts of segregated P on grain boundaries shows improved rolling capability. It is further understood the samples 13, 14, 15, 21 and 22 added with P, together with one of Ti, Nb, and Zr shows further improves rolling capability.

The reason that the rolling capability of the alloy is improved by addition of P is that the grain boundaries are strengthened by segregating P on the grain boundaries, and the grain boundaries are further strengthened and the grain sizes are decreased by the addition of P together with Ti, which results in improved rolling capability.

Especially, when the alloy is added with P and Ti, grain growth does not occur even when the alloy is heat treated at a temperature as high as 1350° C. which is nearly the melting temperature of the alloy, then the rolling capability does not decrease. When Nb or Zr is added to the alloy together with P, size of the grains are uniformly decreased such as about 50 μm which also results in improved rolling capability. However as apparent from the results of samples 17 to 20 shown in Table I, the addition of Ti, Nb, or Zn without adding P does not improve the rolling capability.

According to the present invention, the iron-silicon alloys containing not less than 0.03 weight percent but not more than 5.0 weight percent of P, not less than 2.5 but not more than 10.0 weight percent Si, at least one of Ti, Nb, and Zr with a total amount of not less than 0.01 but not more than 5.0 weight percent, in which P is segregated on the grain boundaries with an amount of not less than 0.5 weight percent of the atoms which form the grain boundaries, exhibit an improved rolling capability and superior magnetic characteristics. The reason that the total amount of at least one of Ti, Nb and Zr is selected not less than 0.01 weight percent, but not more than 5.0 weight percent is that when the amount is less than 0.01 weight percent, it can't be expected to decrease the grain size, and when the amount exceeds 5.0 weight percent, magnetic characteristics of the alloys are deteriorated. To segregate P at an amount of more than 0.5 weight percent, adding amount of P is selected more than 0.03 weight percent, however, when the amount exceeds 5.0 weight percent, magnetic characteristics of the alloy is deteriorated. Thus, the adding amount of P is selected not less than 0.03, but not more than 5.0 weight percent.

As mentioned the above, according to the present invention iron-silicon alloys containing not less than 4.5 weight percent of silicon, even iron-silicon alloy containing 6.5 weight percent of silicon which exhibits zero magnetiostriction can be rolled quite easily. Then the material originally having a superior characteristics can be supplied easily, which enable to use the material for various electrical purposes such as cores of transformer and magnetic transducer head. The noise of transformer due to magnetostriction of the core material can be avoided by selecting the content of silicon as 6.5 weight percent.

Iron-silicon alloys containing relatively smaller amount of silicon for example 3 to 4 weight percent is not impossible to be rolled. According to the present invention when the alloy containing 3 to 4 weight percent silicon, it is possible to improve the rolling capability of the alloy by adding P and at least one of Ti, Nb and Zr. Then upon rolling the alloy, the rolling temperature can be reduced which enable to simplify the structure of the furnace and to save energy.

Further grain oriented silicon steel can be obtained from the alloy of the present invention by applying heat treatment for secondary recrystallization after rolling.

What is claimed is:

1. A magnetic alloy sheet containing not less than 0.03 weight percent but not more than 5.0 weight percent of P, not less than 0.01 weight percent but not more than 5.0 total weight percent of at least one element of Ti, Nb, and Zr, not less than 2.5 weight percent but not more than 10.0 weight percent of Si, and the remaining part consisting mainly of Fe, said alloy having been slow cooled after casting to cause P to be present on the grain boundaries thereof in an amount of more than 0.5 weight percent of the atoms which form said grain boundaries.

2. A magnetic alloy according to claim 1 which includes at least one of the following elements in the amount stated:

up to 7.0 weight percent Cr
up to 5.0 weight percent Mn
up to 7.0 weight percent Ni
up to 6.0 weight percent Cu
up to 5.0 weight percent Y
up to 3.0 weight percent rare earth elements
up to 0.3 weight percent B
up to 0.5 weight percent Pb
up to 3.0 weight percent Be
up to 0.8 weight percent C
up to 0.1 weight percent N
up to 0.5 weight percent Ca
up to 5.0 weight percent V
up to 5.0 weight percent Ge
up to 5.0 weight percent Mo
up to 5.0 weight percent Hf
up to 5.0 weight percent Ta
up to 5.0 weight percent W
up to 3.0 weight percent Sn, and
up to 3.0 weight percent Sb, the total amount of the added element being not less than 0.01 weight percent, but not more than 10 weight percent.

* * * * *